May 14, 1963  J. M. BENTLEY  3,090,000
HIGH IMPEDANCE VOLTAGE COMPARATOR
Filed July 20, 1961
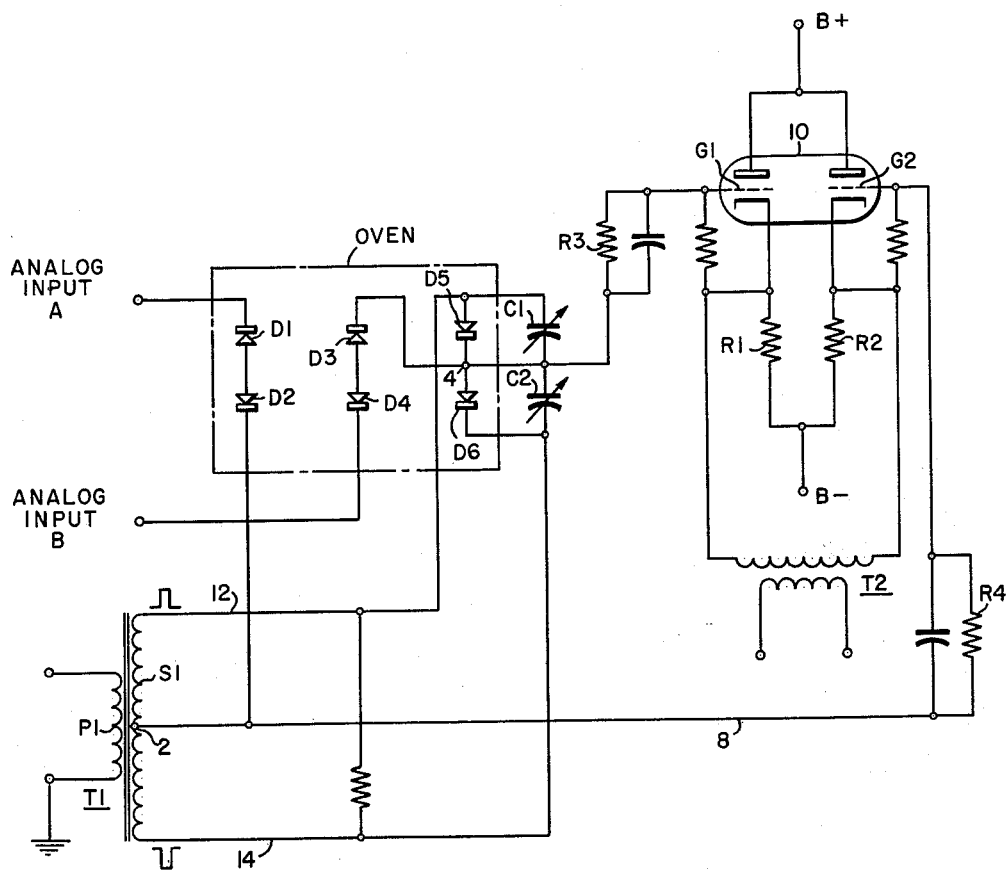
WITNESSES
INVENTOR
John M. Bentley
BY
ATTORNEY United States Patent Office
3,090,000
Patented May 14, 1963

3,090,000
HIGH IMPEDANCE VOLTAGE COMPARATOR
John M. Bentley, Glen Burnie, Md., assignor to Westinghouse Electric Corporation, East Pittsburgh, Pa., a corporation of Pennsylvania
Filed July 20, 1961, Ser. No. 125,505
4 Claims. (Cl. 323—67)

The present invention relates to voltage comparators, and more particularly to high voltage comparators having a high input impedance.

When comparing analog voltages of relatively high values, it is desirable to present a high input impedance to the signals so that the comparator may function at relatively low current levels, so that economical use may be made of circuit components, and the comparator will not act as an excessive drain on the analog voltage supply sources. However, because of the low current levels to be used, it is difficult to obtain a direct indication of the difference between the analog signal amplitudes.

It is therefore an object of the present invention to provide a new and improved high voltage comparator circuit having a high input impedance.

It is a further object of the present invention to provide a new and improved high voltage comparator having a high input impedance and selectively operative to provide a comparison of the analog signals at a low voltage level and with a quick response time.

Broadly, the present invention provides a high input impedance comparator operative to compare the amplitudes of two analog voltages at a relatively high voltage level wherein: the analog voltages to be compared are applied to high input impedances, to a bridge circuit and to differencing means, during steady-stage operation the differencing means receives both analog voltages with the bridge circuit being balanced; whenever a comparison is desired the bridge circuit is unbalanced to permit a difference signal to appear at the differencing means, so that its output is indicative of the difference in amplitudes of the analog voltages and their amplitude with respect to each other.

These and other objects will become more apparent when considered in view of the following specification and drawings, in which:

The single FIGURE is a schematic drawing embodying the features of the present invention.

Referring to the FIGURE, one of the analog voltages A to be compared is applied to the back-to-back connected diodes D1 and D2 and then to the center tap of the secondary winding S1 of the transformer T1. The transformer T1 has a primary winding P1 which is pulsed with a square wave by external means, not shown. The other analog voltage input B is applied through the back-to-back connected diodes D3 and D4 to the common junction 4 between the diodes D5 and D6, which are poled in the same direction. The diodes D5 and D6 are matched to have substantially the same characteristics within a predetermined voltage-current range. The diodes D1, D2, D3 and D4 are selected to have substantially the same characteristics, but are not necessarily matched as are the diodes D5 and D6. All the diodes may be placed in an oven in order to maintain their characteristics over considerable ambient temperature changes to the external circuitry.

The capacitors C1 and C2 are adjustable to serve as trimmer capacitors to balance the bridge circuit including the diodes D5 and D6. In steady state, when the primary P1 of the transformer T1 is not pulsed, the analog signals A and B appear on both grids G1 and G2 of the dual triode 10. The steady state path for the signal A to the grid G1, being through the center tap 2 of the transformer T1, to the diode D5 or D6, through the resistor R3, and then to the grid G1. The analog input B is applied through the common junction 4 of the diodes D5 and D6, through the resistor R3, and then to the grid G1. The steady state path of signal A to the grid G2 is from the center tap lead 8, through the resistor R4, and for the analog signal B from the common junction 4, to the diodes D5 or D6, through the transformer secondary winding S1, to the center tap lead 8, and then through resistor R4.

Both grids G1 and G2 of the cathode follower connected dual triode 10 having the same input signals applied thereto, the output appearing across the cathode resistors R1 and R2 will be equal and will so cancel in the output transformer T2. Therefore, no difference between the analog signals A and B will be seen during steady-state operation of the comparator.

It should be understood that when the diode D5 is forward-biased by a difference between the analog voltages A and B that the diode D6 is reverse-biased to the same amount, and vice versa, during the steady state operation before the transformer T1 is pulsed. Also, it should be noted that the bridge circuit comprising the secondary winding S1, the diodes D5 and D6 and the trimmer capacitors C1 and C2 is perfectly balanced, with the secondary winding S1 being exactly center tapped, the diodes D5 and D6 being selected to have substantially the same voltage-current characteristics and the trimmer capacitors C1 and C2 being adjustable to fine balance the bridge.

When it is desired to make a comparison of the analog voltages A and B, the primary winding P1 of the transformer T1 is pulsed with a square wave form, by any well known means. The square wave pulses appearing across the bridge circuit on leads 12 and 14 will have the same amplitude, but will be of opposite polarity with respect to each other. Because of this opposite polarity the diode D5 will be forward-biased by the pulse on lead 12 and the diode D6 will also be forward-biased by the pulse appearing on lead 14. However, due to the pulses being of the same amplitude the diodes D5 and D6 will be forward-biased to the same extent. If the analog voltages A and B are of the same amplitude, there will be no difference voltage between junction 4 between the diodes D5 and D6 and junction 2 at the center top of the winding S1, so that after the transformer T1 has been pulsed, the pulses on leads 12 and 14 affect the bias of the diodes D5 and D6 to the same extent. Both of the diodes, being biased to the same point, prior to being pulsed will then provide no different output signal from the point 4 to the grid of the tube 10 than was provided in steady state.

If, however, the analog voltage A is larger than the analog voltage B, the diode D5 will be forward biased and the diode D6 wil be reverse-biased to the same extent. When the transformer T1 is pulsed the pulse appearing on lead 12 tends to forward bias the diode D5 to a greater extent, while the pulse appearing on lead 14 tends to drive the diode D6 from being in a reverse-biased state to a forward-biased state. Therefore, an output pulse will appear at the junction 4 due to the fact that the diode D5 becomes more conductive and the diode D6 becomes more conductive, but not to so great an extent as the diode D5. If the reverse-bias on the diode D6 is larger than the magnitude of the pulse appearing on the lead 14 the diode D6 will not become forward-biased and so will not be rendered conductive at all during the pulsing period. In this case, the entire pulse appearing on lead 12 will appear at junction 4. In the case when the difference between the analog voltage A and B is only such to reverse-bias the diode D6 to an extent that the pulse on lead 14 drives the diode D6 somewhat into conduction but, of course, not so far as the diode D5, the output pulse appearing at junction 4 will be partially canceled due to the conduction of the diode D6. The pulse then appearing at the junction 4 is applied to the grid G1 where it is seen as a positive pulse increasing the conductivity of the tube associated therewith. Thus, a difference output appears across the transformer T2 as the same input signals have been applied to the grid G2 as the center tap 2 has not seen any change from steady state due to the pulsing of the transformer T1. The polarity of the output of the transformer T2 will be indicative that the analog voltage A is larger than the analog voltage B.

On the other hand should the analog voltage A be less than analog B, the diode D6 is forward-biased and the diode D5 is reverse-biased to the same extent, so that when the transformer T1 is pulsed the diode D6 tends to be driven more into its forward-biased state to increase its conductivity while the diode D5 also is driven back toward its forward-biased direction. Thus, an output pulse appears at the junction 4 of an opposite polarity as was the case when the analog voltage A was larger than the analog voltage B. The relative difference between these analog voltages determines the magnitude of the pulse appearing at the junction 4. If the magnitude of the pulse appearing on lead 14 is not sufficient to drive the diode D5 into its conducting state the entire pulse appears at the junction 4. If the pulse appearing on lead 14 is sufficient to drive the diode D5 partially into its forward direction there would be a partial cancellation of the pulse appearing at the junction 4. The magnitude of this pulse would be indicative of the relative magnitude between the analog voltages. The pulse appearing on the junction 4 then being applied to G1 changes the conductivity of the tube associated therewith, so that output pulse from the transformer T2 is in proportion to the pulse applied to the grid G2, and whose polarity is indicative that the analog voltage B is larger than the analog voltage A.

I claim as my invention:

1. A high impedance comparator for selectively comparing the amplitude of two analog signals comprising, a transformer including a primary winding operative to be selectively pulsed and a secondary winding having a center tap, a pair of unidirectional devices poled in the same direction having a common junction therebetween, first high impedance means operatively connected to receive one of said analog signals and apply said signals to said center tap, second high impedance means operatively connected to receive the other of said analog signals and to apply said signals to said common junction, with said pair of unidirectional devices being connected across said secondary winding, and differencing means operatively connected to said center tap and to said common junction and being operative to provide difference signals of said analog signals in response to said primary winding being pulsed.

2. A high impedance comparator for selectively comparing the amplitude of two analog signals comprising, a transformer including a primary winding operative to be selectively pulsed and a secondary winding having a center tap, a pair of diodes poled in the same direction having a common junction therebetween and a capacitor connected across each of said diodes of said first pair, first high impedance means operatively connected to receive one of said analog signals and apply said signals to the center tap of said secondary winding, second high impedance means operatively connected to receive the other of said analog signals and to apply said signals to the common junction of said pair of diodes, with said pair of diodes being connected cross said secondary winding, and differencing means operatively connected to the center tap of said secondary winding and to the common junction of said pair of diodes and being operative to provide difference signals of said analog signals in response to said primary winding being pulsed.

3. A high impedance comparator for selectively comparing the amplitude of two analog signals comprising, a transformer including a primary winding operative to be selectively pulsed and a secondary winding having a center tap, a bridge circuit including a first pair of diodes poled in the same direction having a common junction therebetween and a capacitor connected across each of said diodes of said first pair, said capacitors being adjustable to balance said bridge circuit, a second pair of diodes connected back-to-back and operatively connected to receive one of said analog signals and apply said one signal to the center tap of said secondary winding, a third pair of diodes connected back-to-back and operatively connected to receive the other of said analog signals and to apply said other signals to the common junction of said bridge circuit, with said bridge circuit being connected across said secondary winding of said transformer, and differencing means operatively connected to the center tap of said secondary winding operatively connected to the common junction of said bridge circuit and being operative to provide difference signals of said analog signals in response to said primary winding being pulsed.

4. In a high impedance comparator for selectively comparing the amplitude of two analog signals the combination of, a first pair of diodes connected back-to-back to receive one of said analog signals, a second pair of diodes connected back-to-back to receive the other of said analog signals, said first and second pair of diodes acting as a high impedance input to said analog signals, a transformer having a primary winding operative to be selectively pulsed and a center tapped secondary winding, said first pair of diodes operatively connected to apply said analog signals passing therethrough to said center tap, a bridge circuit including a third pair of diodes poled in the same direction having a common junction therebetween and a capacitor connected across each of said third pair of diodes, said capacitors being adjustable to balance said bridge circuit, said second pair of diodes operatively connected to pass to said common junction said analog signals applied thereto, with the bridge circuit being connected across said secondary winding, and differencing means connected to said common junction and to said center tap to provide a difference signal between said analog signals in response to said primary winding being pulsed.

No references cited.